United States Patent
Gieshoff et al.

(10) Patent No.: US 7,310,940 B2
(45) Date of Patent: Dec. 25, 2007

(54) METHOD OF OPERATING A SYSTEM COMPRISING A DIESEL ENGINE AND CATALYST FOR EXHAUST GAS PURIFICATION

(75) Inventors: Jürgen Gieshoff, Biebergemünd (DE); Martin Votsmeir, Maintal (DE); Stephan Malmberg, Rodenbach (DE); Egbert Lox, Hochwaldhausen (DE); Thomas Kreuzer, Karben (DE)

(73) Assignee: Umicore AG & Co. KG, Hanua-Wolfgang (DE)

( * ) Notice: Subject to any disclaimer, the term of this patent is extended or adjusted under 35 U.S.C. 154(b) by 0 days.

(21) Appl. No.: 10/558,142

(22) PCT Filed: May 18, 2004

(86) PCT No.: PCT/EP2004/005360

§ 371 (c)(1), (2), (4) Date: Sep. 25, 2006

(87) PCT Pub. No.: WO2004/103528

PCT Pub. Date: Dec. 2, 2004

(65) Prior Publication Data

US 2007/0006570 A1 Jan. 11, 2007

(30) Foreign Application Priority Data

May 22, 2003 (DE) .................... 103 23 247

(51) Int. Cl.
*F01N 3/00* (2006.01)

(52) U.S. Cl. .................. 60/285; 60/274; 60/277; 60/284

(58) Field of Classification Search ........... 60/274, 60/276, 277, 284, 285, 286
See application file for complete search history.

(56) References Cited

U.S. PATENT DOCUMENTS

| | | | |
|---|---|---|---|
| 5,201,173 A * | 4/1993 | Fujimoto et al. | 60/277 |
| 5,261,230 A * | 11/1993 | Yuuki et al. | 60/276 |
| 5,325,664 A * | 7/1994 | Seki et al. | 60/276 |
| 5,649,420 A * | 7/1997 | Mukaihira et al. | 60/274 |
| 5,675,967 A * | 10/1997 | Ries-Mueller | 60/274 |
| 5,693,877 A | 12/1997 | Oshuga et al. | |
| 5,857,163 A | 1/1999 | Trombley et al. | |
| 6,761,023 B1 * | 7/2004 | Schnaibel et al. | 60/277 |
| 7,007,461 B2 * | 3/2006 | Lewis et al. | 60/285 |

FOREIGN PATENT DOCUMENTS

| | | |
|---|---|---|
| DE | 10148128 A | 4/1999 |
| EP | 0 498 598 A | 8/1992 |

* cited by examiner

*Primary Examiner*—Binh Q. Tran
(74) *Attorney, Agent, or Firm*—Kalow & Springut LLP; William D. Schmidt

(57) ABSTRACT

The invention relates to a method and an apparatus of operating a drive system comprising an engine and an exhaust gas purification unit containing a catalyst, where the engine emits an exhaust gas having an exhaust gas temperature and the catalyst has a catalytic activity for the purification of the exhaust gas. In the method, an aging-induced decrease in the catalytic activity of the catalyst is compensated at least part of the time by increasing the exhaust gas temperature of the engine.

3 Claims, 5 Drawing Sheets

METHOD OF OPERATING A SYSTEM COMPRISING A DIESEL ENGINE AND CATALYST FOR EXHAUST GAS PURIFICATION

FIELD OF THE INVENTION

The present invention relates to a method of operating a drive system comprising a diesel engine provided with a diesel oxidation catalyst for purifying the exhaust gases from the engine.

BACKGROUND OF THE INVENTION

The main pollutants from diesel engines are, apart from the very small amounts of hydrocarbons (HC) and carbon monoxide (CO), nitrogen oxides (NOx) and soot particles (PM). The soot particles are composed of a constituent which is soluble in organic solvents and a constituent which is insoluble. The soluble part comprises a large number of different hydrocarbons which are condensed or adsorbed or absorbed on the particle core. The insoluble component comprises sulfur trioxide or sulfate, carbon, abraded metal (for example iron and nickel) and small amounts of other oxides formed from additives in lubricating oil and in the fuel (for example zinc, calcium, phosphorus). Sulfur trioxide is formed by oxidation of sulfur dioxide over the catalyst as a function of temperature, noble metal loading and exhaust gas flow. A particular characteristic of diesel engines is the high oxygen content of the exhaust gas. While the exhaust gas of stoichiometrically operated gasoline engines contains only about 0.7% by volume of oxygen, the exhaust gas of diesel engines can contain from 6 to 15% by volume of oxygen.

The ratio of the various pollutants in the diesel exhaust gas to one another depends on the type of diesel engine and its mode of operation. In principle, what has been said above applies both to stationary diesel engines and to diesel engines in motor vehicles for light and heavy duties.

The permissible emissions of diesel engines are subjected to upper limits imposed by legislation. To adhere to these limits, various concepts are employed depending on the type of diesel engine and its mode of operation.

In the case of relatively low power diesel engines in passenger cars, it is frequently sufficient to pass the exhaust gas over a diesel oxidation catalyst which burns the emitted hydrocarbons, carbon monoxide and also part of the soluble organic compounds adsorbed on the soot particles. The oxidation function of diesel oxidation catalysts is designed so that although they oxidize the organic compounds and carbon monoxide, they do not convert the nitrogen oxides and sulfur dioxide into more highly oxidized species. Together with the remaining proportion of the particles, the nitrogen oxides and sulfur oxide leave the catalyst virtually unchanged. A typical representative of such catalysts is described in DE 39 40 758 A1 (U.S. Pat. No. 5,157,007).

The conversion of pollutants by means of such catalysts is strongly dependent on the temperature. In the case of carbon monoxide and hydrocarbons, the conversion of the pollutants increases with increasing exhaust gas temperature. The temperature at which a prescribed percentage, usually 50%, of a pollutant is reacted is referred to as the light-off temperature of the catalyst for the conversion of this pollutant. It is an important parameter for describing the catalytic activity of the catalyst.

Furthermore, the aging state of the catalysts has a significant influence on the degree of conversion for the various pollutants. As aging increases, the catalytic activity of the catalysts decreases. Aging can comprise damage caused by thermal overloading and/or poisoning by poisoning elements such as lead, phosphorus, calcium and sulfur, some of which are present in the fuel or are constituents of motor oil.

The catalysts have to be able to ensure adherence to particular limit values for pollutant conversion even after the vehicle has been driven for up to 150 000 miles. This requirement is usually fulfilled by over-dimensioning of the fresh catalyst. Thus, for example, it can be designed so as to be significantly larger than would be necessary on the assumption of its fresh activity, or the catalyst formulation in terms of composition and noble metal loading is adapted appropriately.

It is known that high noble metal loadings have to be used in diesel vehicles in order to be able to adhere to the emission limits even after aging because of the low exhaust gas temperatures.

SUMMARY OF THE INVENTION

It is an object of the present invention to provide a method of operating a drive system comprising a diesel engine and an exhaust gas purification unit containing a diesel oxidation catalyst, which method allows the aging-induced decrease in the catalytic activity of the catalyst to be compensated by means of suitable control measures in operation of the drive system, so that the customary over-dimensioning of the catalyst can be reduced.

This object is achieved by a method in which the aging-induced decrease in the catalytic activity of the catalyst is compensated at least part of the time by increasing the exhaust gas temperature of the engine.

The invention is described below for a drive system comprising a diesel engine and an exhaust gas purification unit containing a diesel oxidation catalyst However, it can readily be seen that the present invention can also be applied in the same way to other internal combustion engines and catalysts, for example to a four-stroke engine with three-way catalyst.

DETAILED DESCRIPTION OF THE PREFERRED EMBODIMENTS

Various driving cycles have been developed for checking adherence to the exhaust gas limits. Thus, the "New European Driving Cycle", referred to as NEDC for short, specifies a driving cycle commencing with a cold start followed by inner city operation with acceleration and braking phases and a maximum speed of 50 km/h. The last third of the test provides for country operation at a maximum speed of 120 km/h. The total test takes about 1200 seconds. The vehicle covers a distance of about 11.4 km during this driving cycle.

Figure 1:
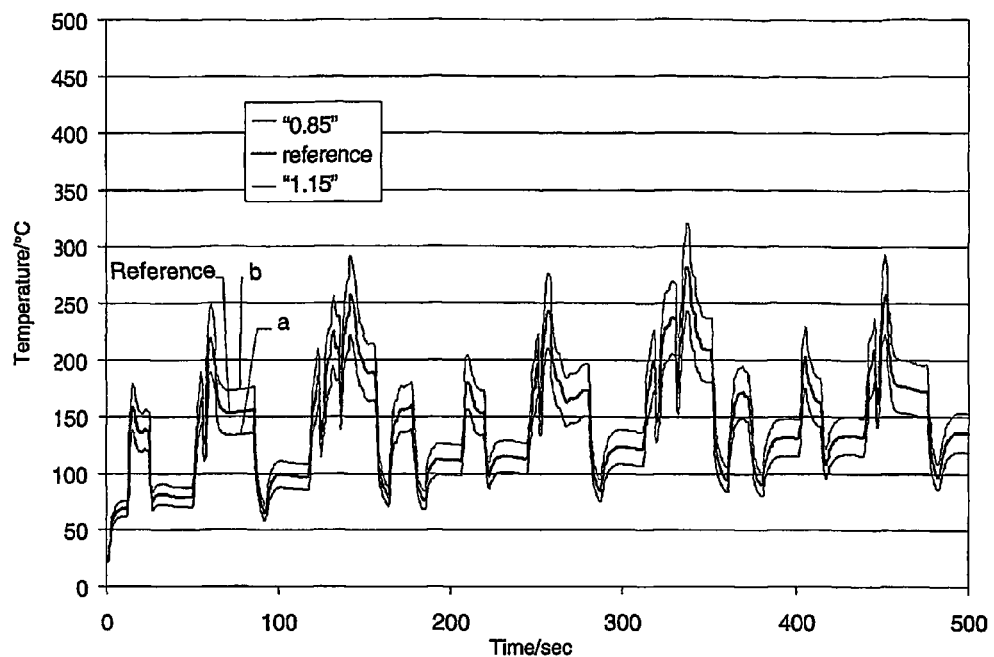
FIG. 1 shows the exhaust gas temperature of a 1.4l diesel engine as a function of the test time for the first 500 seconds of the NEDC test.

FIG. 1 shows the exhaust gas temperature of a 1.4l diesel engine as a function of the test time for the first 500 seconds of the NEDC test. The curve denoted as "reference" records the actual exhaust gas temperatures of the diesel engine. This engine is equipped with a standard honeycomb catalyst having a volume of 2.4l, a cell density of 62 $cm^{-2}$ and a platinum loading of 2.83 g/l (80 g/ft$^3$) for exhaust gas purification.

Figure 2:
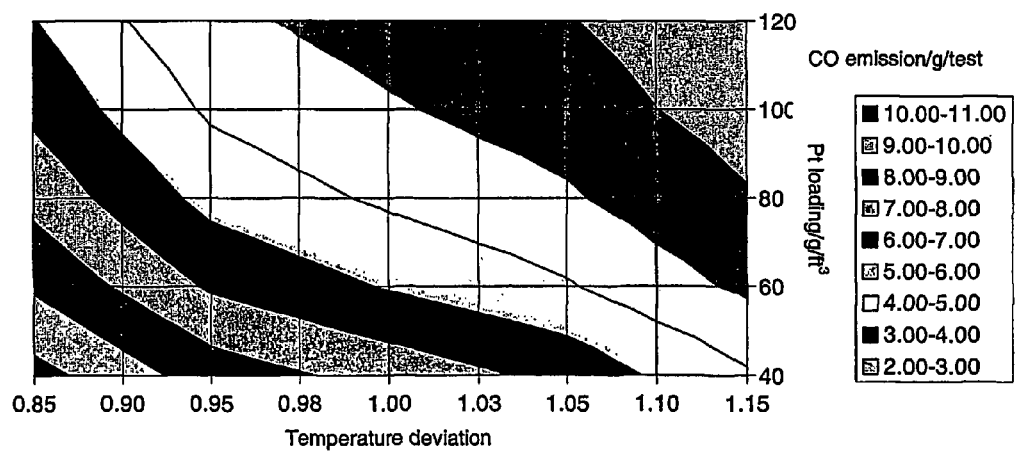
FIG. 2 shows modeling calculations on the CO emission of the diesel engine during the test for different platinum loadings of the diesel oxidation catalyst.

FIG. 2 shows modeling calculations by the inventors on the CO emission of the diesel engine during the test for different platinum loadings of the diesel oxidation catalyst. The emission values were calculated for exhaust gas temperatures decreased or increased linearly relative to the reference case. The emission values for the abscissa value of 1.00 indicate the CO emission of the diesel engine at the original exhaust gas temperature corresponding to the reference curve of FIG. 1 for different platinum loadings. For abscissa values deviating from this, an exhaust gas temperature of the diesel engine increased or reduced linearly relative to the reference curve was assumed. In the case of the abscissa values 0.85 and 1.15, these temperature curves are shown in FIG. 1, curve a) for an exhaust gas temperature reduced linearly by 15% and curve b) for an exhaust gas temperature increased linearly by 15%.

It can be seen from FIG. 2 that the emission of carbon monoxide during the test at a given platinum loading can be decreased by increasing the exhaust gas temperature. Thus, an aging-induced deterioration in the emission values can be compensated by increasing the exhaust gas temperature.

It is known that the exhaust gas temperatures of a diesel engine can be increased by means of various measures. For the purposes of the invention, the exhaust gas temperature of the engine can be increased either immediately after the cold start or after some time delay. In the first case, preference is given to selecting measures which have only a small influence on the emission behavior of the engine so as to prevent excessive emission of pollutants during the cold start phase. In the latter case, it is also possible to choose measures which lead to somewhat higher emission values, since pollutants are reliably converted into nonpolluting substances by the method of the invention.

Possible measures for increasing the exhaust gas temperature for the purposes of the method of the invention are, for example:

Choking the air drawn in, which results in the amount of exhaust gas being reduced at the same power; this leads to a higher temperature Increasing the exhaust gas temperature by post-injection, possibly in only one cylinder Shifting the combustion peak to "later"; a 1° shift in the combustion peak results in a temperature increase of about 10 K Increasing the exhaust gas backpressure Altering the gearing ratio of the gearbox Switching off the charge cooling The above measures for increasing the temperature of the exhaust gas result in a slight increase in fuel consumption. To keep this additional consumption as small as possible, these measures are preferably employed only when the exhaust gas temperature drops below a prescribed minimum temperature. When the diesel engine is operated at high load, the exhaust gas temperature is generally sufficiently high for even an aged catalyst to ensure satisfactory conversion of pollutants.

Figure 3:
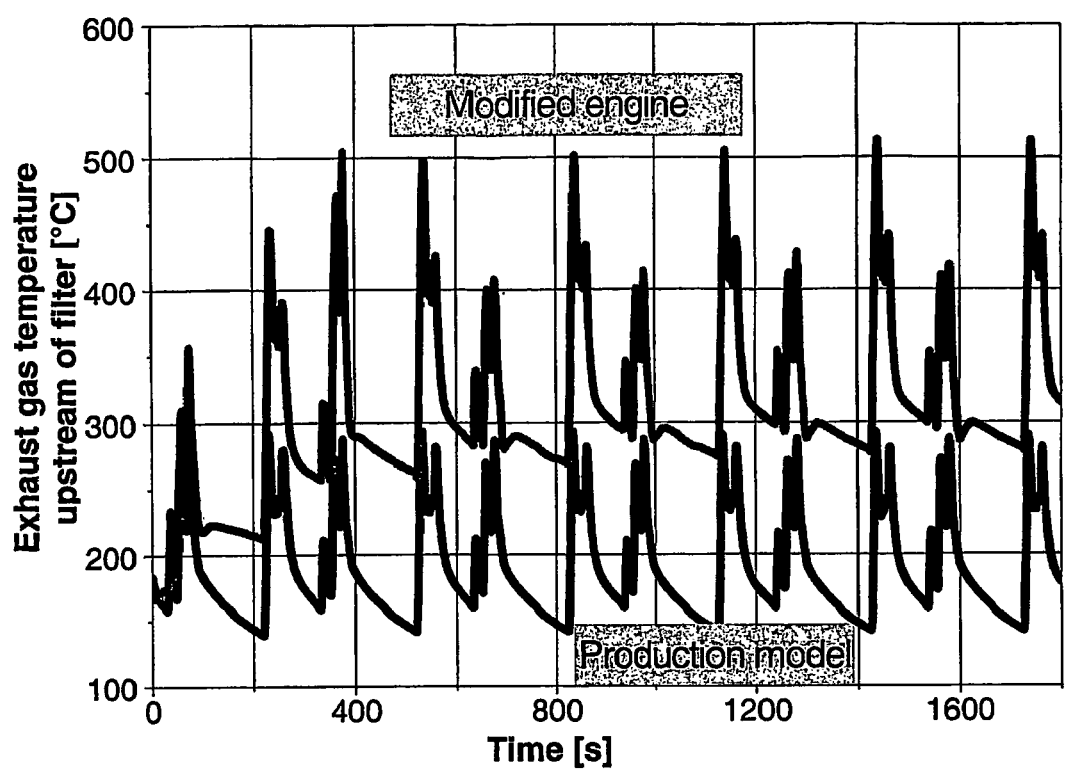
FIG. 3 shows the exhaust gas temperature upstream of a particle filter for particular driving cycles.

Among the above-described measures for increasing the temperature of the exhaust gas, choking the engine is very effective. FIG. 3 shows this by way of example for a heavy duty vehicle engine. The temperature curve denoted by "production model" indicates the exhaust gas temperature upstream of a particle filter for a particular driving cycle. The exhaust gas temperature during this same driving cycle can be increased by about 100° C. by choking the engine (curve "modified engine"). This causes an additional fuel consumption of about 10%. However, the method of the invention generally requires a temperature increase of only 20 K or less to compensate for the aging of the catalyst. The additional fuel consumption due to the method will therefore be correspondingly lower.

The aging-induced decrease in the catalytic activity can be determined in various ways. In the simplest case, an average aging behavior for a series of catalysts can be measured beforehand as a function of the time of operation. To implement the method, it is then possible, for example, to enter the necessary modifications to the operating parameters which ensure a sufficient increase in the exhaust gas temperature for the respective aging state in the engine control system of the diesel engine as a function of the time of operation.

However, it is more advantageous to determine the aging state of the catalyst directly. Both continuous and discontinuous methods of determination are suitable for this purpose. For example, the aging state can be determined by continuously measuring the pollutant conversion by means of a directly measuring gas sensor system and fitting the data to a catalyst model entered in the engine control system. Similarly to the previous case, the necessary modifications to the operating parameters which ensure a sufficient increase in the exhaust gas temperature for the respective aging state can be entered in the engine control system as a function of the aging state determined.

The gas sensor system for determining the pollutant conversion can, for example, comprise a sensor upstream of the catalyst and a sensor downstream of the catalyst for the pollutant concerned (CO, HC or NO). The sensor upstream of the catalyst can be omitted if the pollutant concentrations in the exhaust gas for any operating point of the engine have previously been entered in the form of performance characteristics in the engine control system.

As indicated above, the aging state of the catalyst can also be determined discontinuously, i.e. after a particular distance covered or a particular number of hours of operation. For this purpose, for example, the heat evolved over the catalyst on post-injection of a defined amount of hydrocarbons can be measured. The fresh catalyst burns the additional hydrocarbons better than the aged catalyst and therefore leads to a greater increase in the temperature of the exhaust gas as a result of this process.

The necessary changes to the operating parameters of the engine can be determined directly as follows: the heat evolved in the combustion of a given amount of hydrocarbons over the catalyst is firstly measured and compared with the heat evolved over the fresh catalyst at this operating point. In the case of a reduced amount of heat evolved compared to the fresh catalyst, the exhaust gas temperature of the engine prevailing at this operating point is increased without altering the torque by engine measures until the newly measured heat evolved over the aged catalyst corresponds to the heat evolved over the fresh catalyst. From this it is possible to determine the factor by which the exhaust gas temperature has to be increased to compensate for the aging-induced decrease in performance of the catalyst. In this case too, the necessary modifications to the process parameters which ensure a sufficient increase in the exhaust gas temperature for the respective aging state at all other operating points can be entered in the engine control system as a function of the factor determined.

If the diesel engine is also equipped with a particle filter, the above-described determination of the aging state via the heat evolved on combustion of a defined amount of hydrocarbons can also be combined particularly advantageously with the regeneration function for the particle filter. To regenerate the particle filter, the exhaust gas temperature at the particle filter is from time to time increased to the ignition temperature of the soot in order to burn the latter. This is usually achieved by post-injection of hydrocarbons and combustion of these over the oxidation catalyst. The heat evolved in this procedure can at the same time be utilized for determining the aging state of the oxidation catalyst.

Figure 4:
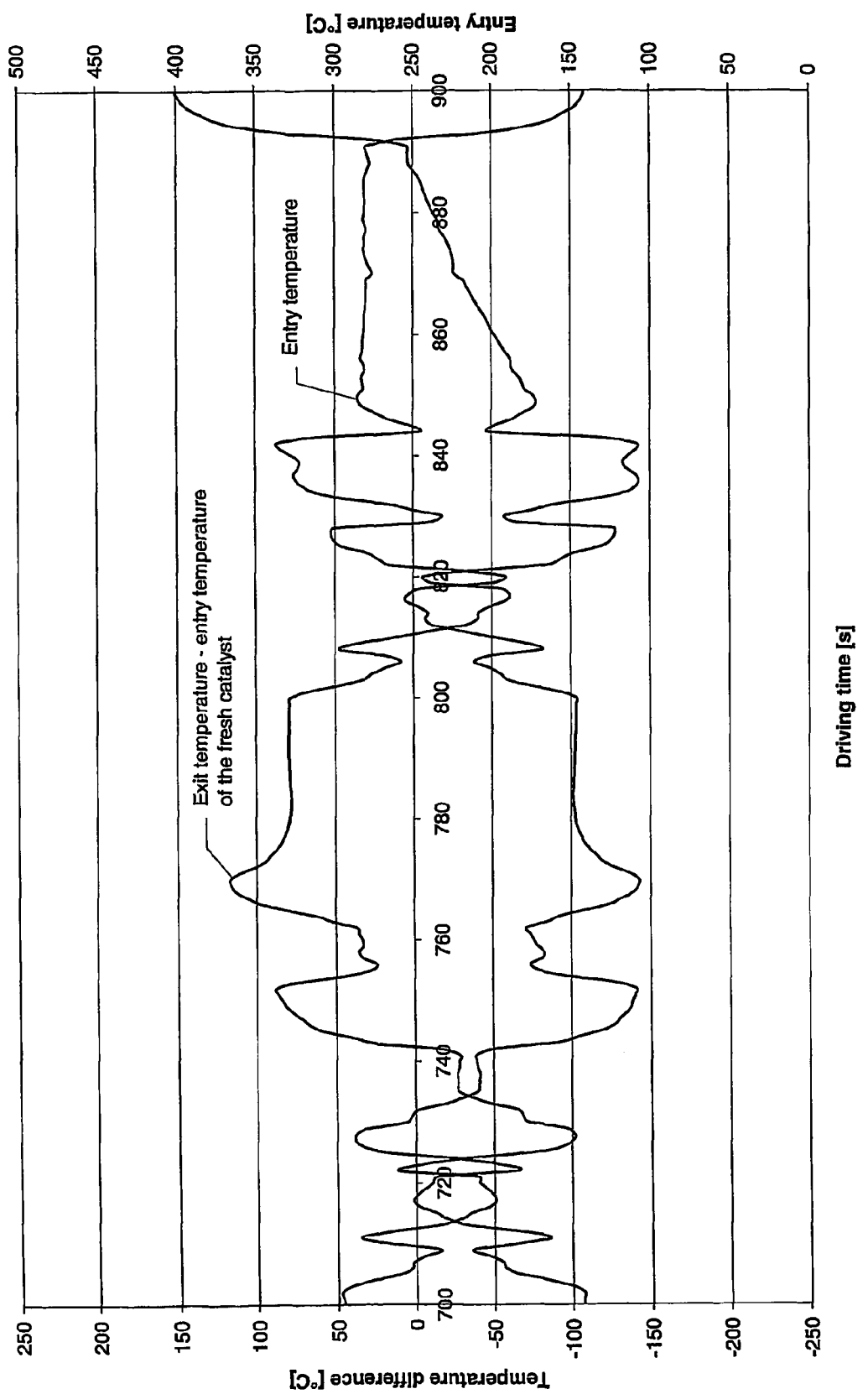
FIGS. 4 to 6 illustrate the determination of the aging state by means of the evolution of heat with the aid of modeling calculations for a drive system comprising a 1.4l diesel engine provided with a 2.4l honeycomb catalyst.
Figure 5:
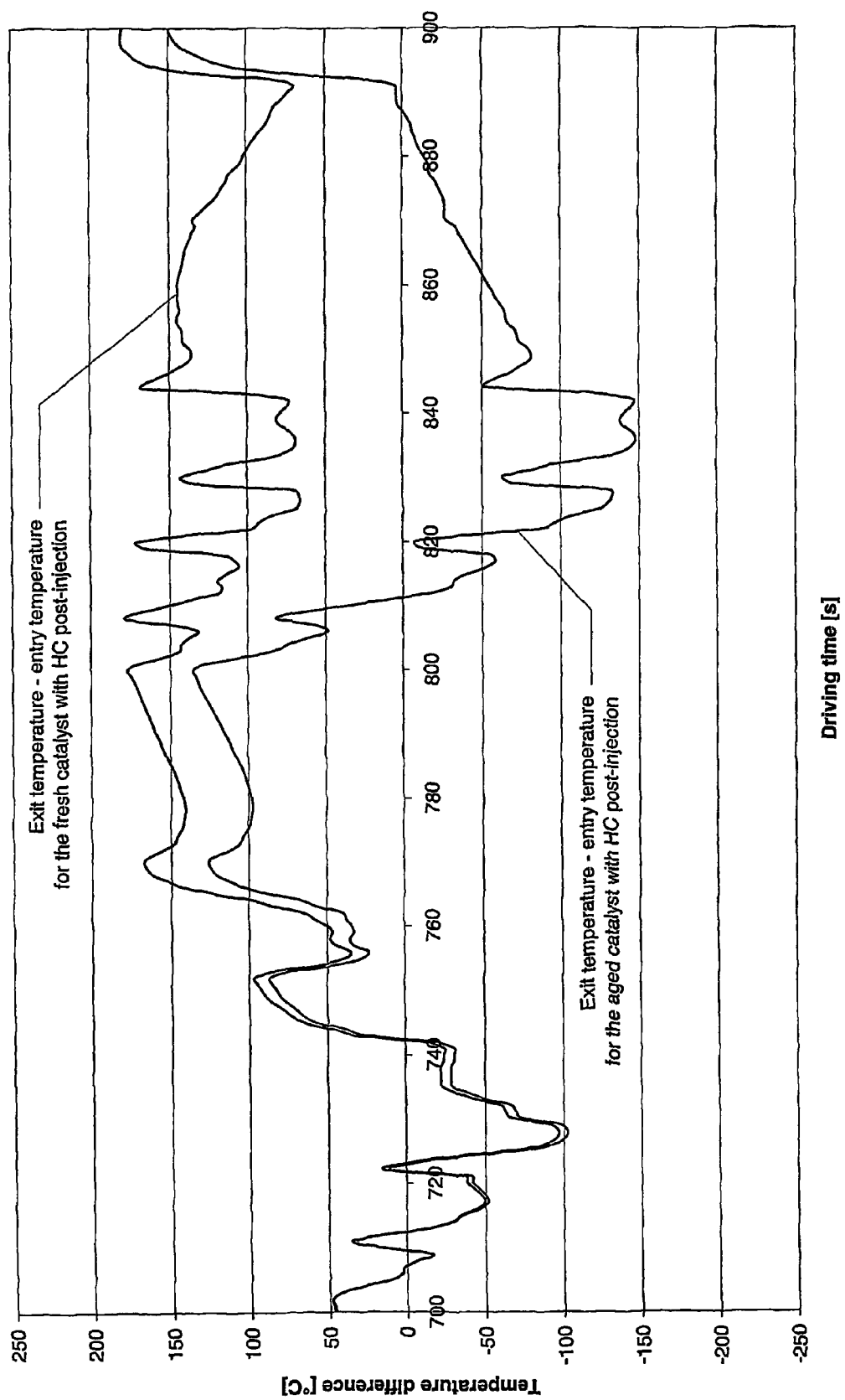
Figure 6:
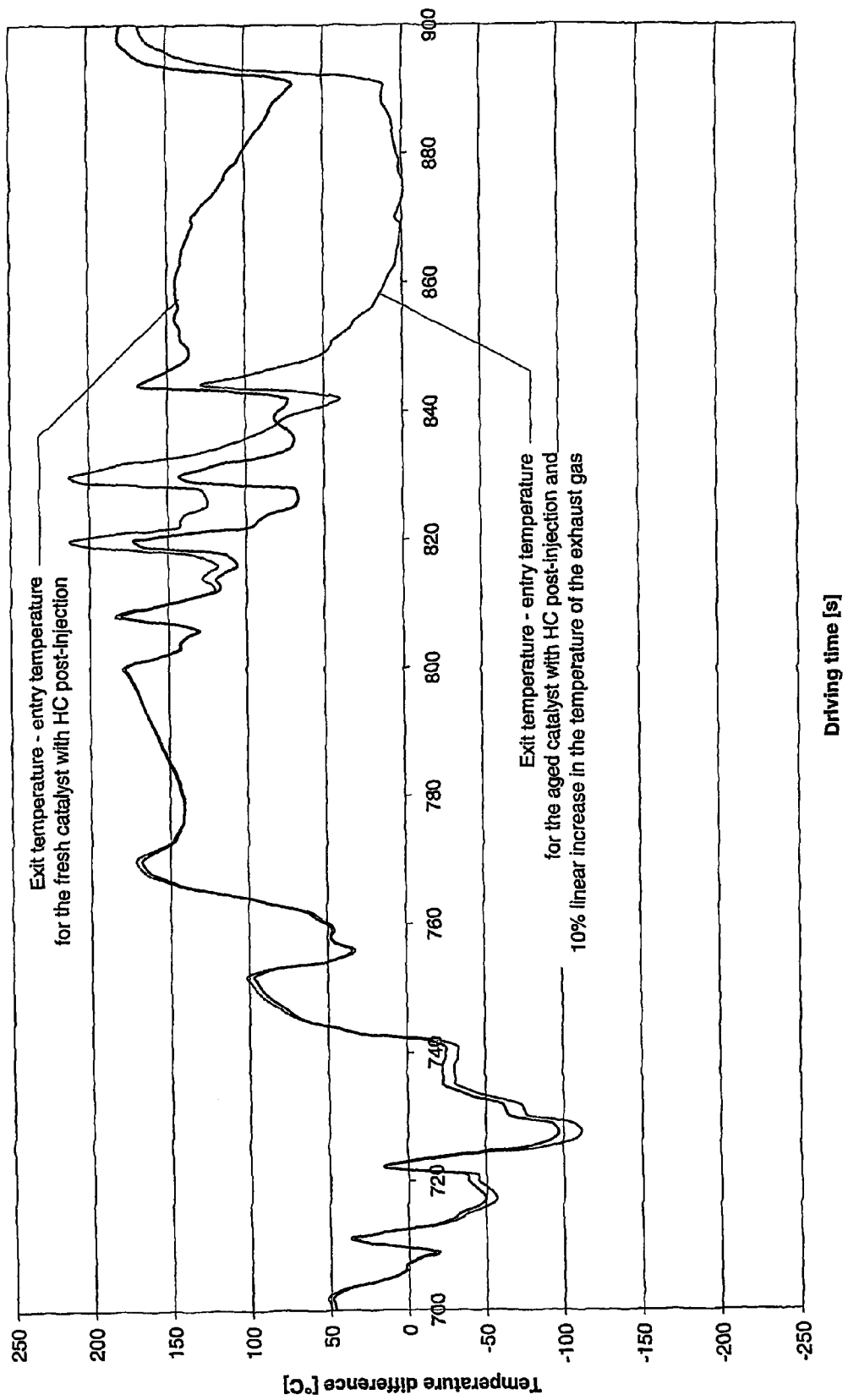

FIGS. 4 to 6 illustrate the determination of the aging state by means of the evolution of heat with the aid of modeling calculations on the above-described drive system comprising a 1.4l diesel engine provided with a 2.4l honeycomb catalyst. The modeling calculations were carried out for an arbitrary section of the NEDC test. It was assumed that post-injection increases the HC concentration in the exhaust gas to 10 000 ppm in the driving time interval from 710 to 830 seconds.

FIG. 4 shows the calculated temperature curves for the exhaust gas temperature at the entrance to the catalyst (curve "entry temperature") and for the temperature difference between the exit temperature of the exhaust gas on leaving the catalyst and the entry temperature. A positive temperature difference indicates an exothermic reaction over the catalyst. The calculation of the temperature difference in FIG. 4 was carried out for a fresh catalyst without HC post-injection.

FIG. 5 shows the comparison of the evolution of heat with post-injection of hydrocarbons for the fresh catalyst and an aged catalyst. It can be seen that the evolution of heat over the aged catalyst is significantly lower than in the case of the fresh catalyst.

FIG. 6 shows the comparison of the evolution of heat over the fresh catalyst with post-injection with the evolution of heat over the aged catalyst with post-injection and a simultaneous, linear temperature increase by 10%. As can be seen from FIG. 6, a linear temperature increase of 10% in the calculated example is sufficient to increase the reduced catalytic activity of the aged catalyst almost to the level of the fresh catalyst.

What is claimed is:

1. A method of operating a drive system comprising an engine and an exhaust gas purification unit containing a catalyst, where the engine emits an exhaust gas having an exhaust gas temperature and the catalyst has a catalytic activity for the purification of the exhaust gas, wherein an aging-induced decrease in the catalytic activity of the catalyst is compensated at least part of the time by increasing the exhaust gas temperature of the engine, wherein the aging-induced decrease in the catalytic activity of the catalyst is compensated by increasing the exhaust gas temperature of the engine by a factor for all operating points of the engine whereby said factor is determined as follows:

a) the heat evolved in the combustion of a given amount of hydrocarbons over the catalyst at a certain operating point of the engine is measured after a defined number of hours of operation, b) the heat evolved is compared with the heat evolved over a fresh catalyst at this operating point, c) in case of a reduced amount of heat evolved compared to the fresh catalyst, the exhaust gas temperature of the engine prevailing at this operating point is increased without altering the torque by engine measures until the newly measured heat evolved over the aged catalyst corresponds to the heat evolved over the fresh catalyst, d) determining said factor as the ratio of the exhaust gas temperature of the engine after temperature increase in step c) relative to the exhaust gas temperature before temperature increase.

2. The method as claimed in claim 1, wherein the aging-induced decrease in the catalytic activity of the catalyst is compensated by a linear increase in the exhaust gas temperature of the engine.

3. A method according to claim 1, wherein the method comprises providing an apparatus for a drive system comprising an engine and an exhaust gas purification unit containing a catalyst, where the engine emits an exhaust gas having an exhaust gas temperature and the catalyst has a catalytic activity for the purification of the exhaust gas and the apparatus provides a facility for compensating an aging-induced decrease in the catalytic activity of the catalyst at least part of the time by increasing the exhaust gas temperature of the engine.

* * * * *